(12) United States Patent
Wang et al.

(10) Patent No.: US 12,199,303 B2
(45) Date of Patent: Jan. 14, 2025

(54) CONTROL SYSTEM AND CHARGE AND DISCHARGE CONTROL SYSTEM

(71) Applicant: CONTEMPORARY AMPEREX TECHNOLOGY (HONG KONG) LIMITED, Hong Kong (CN)

(72) Inventors: Jia Wang, Ningde (CN); Zhihui Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 40 days.

(21) Appl. No.: 18/083,739

(22) Filed: Dec. 19, 2022

(65) Prior Publication Data

US 2023/0145039 A1 May 11, 2023

Related U.S. Application Data

(63) Continuation of application No. PCT/CN2022/089621, filed on Apr. 27, 2022.

(30) Foreign Application Priority Data

Nov. 9, 2021 (CN) .......................... 202122738747.5

(51) Int. Cl.
H01M 50/325 (2021.01)
G01L 19/08 (2006.01)
G01L 19/12 (2006.01)
(52) U.S. Cl.
CPC ......... *H01M 50/325* (2021.01); *G01L 19/083* (2013.01); *G01L 19/12* (2013.01); *H01M 2200/20* (2013.01)
(58) Field of Classification Search
CPC .................................................. H01M 50/325
See application file for complete search history.

(56) References Cited

U.S. PATENT DOCUMENTS

2014/0057144 A1 2/2014 Yang
2015/0378370 A1* 12/2015 Maichl ............... F15B 13/0867
137/487.5

FOREIGN PATENT DOCUMENTS

CN 103812090 A 5/2014
CN 108336431 A 7/2018
(Continued)

OTHER PUBLICATIONS

Notice of Grant of Utility Model Patent Rights for CN application No. 202122738747.5, dated Apr. 25, 2023.
(Continued)

*Primary Examiner* — Olatunji A Godo
(74) *Attorney, Agent, or Firm* — Ladas & Parry LLP

(57) ABSTRACT

Embodiments of this application relate to the field of power source control technologies, and disclose a control system and a charging and discharging control system. The control system includes a control circuit and an intermediate computer, where the control circuit includes a pressure sensor, a piezoelectric valve, and a controller; the pressure sensor is configured to collect pressure information; the controller is configured to receive the pressure information collected by the pressure sensor and transmit the pressure information to an intermediate computer; the intermediate computer is configured to transmit the pressure information to an upper computer, receive a preset pressure value generated by the upper computer based on the pressure information, and transmit the preset pressure value to the controller; and the controller is further configured to control the piezoelectric valve based on the preset pressure value.

11 Claims, 3 Drawing Sheets

(56) References Cited

FOREIGN PATENT DOCUMENTS

| | | | |
|---|---|---|---|
| CN | 108604806 | A | 9/2018 |
| CN | 110703655 | A | 1/2020 |
| CN | 110716145 | A | 1/2020 |
| DE | 102013221760 | A1 | 5/2015 |
| JP | 2008288168 | A | 11/2008 |
| JP | 2010160981 | A | 7/2010 |
| JP | 2012238513 | A | 12/2012 |
| JP | 2019509003 | A | 3/2019 |

OTHER PUBLICATIONS

Decision to Grant a Patent for JP application No. 2022-558357, dated Jan. 9, 2024.
Request for the Submission of an Opinion for KR Application No. 10-2022-7033960, dated Apr. 9, 2024.
Extended European Search Report for EP application No. 22802866.8, dated Feb. 1, 2024.
International Search Report for International Application PCT/CN2022/089621, mailed Jul. 28, 2022.
Written Opinion of International Search Authority for International Application PCT/CN2022/089621, mailed Jul. 28, 2022.
Written Decision on Registration for KR application No. 10-2022-7033960, dated Oct. 4, 2024.

\* cited by examiner

CONTROL SYSTEM AND CHARGE AND DISCHARGE CONTROL SYSTEM

CROSS-REFERENCE TO RELATED APPLICATIONS

This application is a continuation of International Patent Application No. PCT/CN2022/089621, filed on Apr. 27, 2022, which claims priority to Chinese patent application No. 202122738747.5, filed on Nov. 9, 2021. The aforementioned patent applications are incorporated herein by reference in their entirety.

TECHNICAL FIELD

Embodiments of this application relate to the field of power source control technologies, and specifically, to a control system and a charging and discharging control system.

BACKGROUND

Energy conservation and emission reduction are critical to sustainable development of the automobile industry. Due to advantages of energy conservation and environmental protection, electric vehicles have become an important part for sustainable development of the automobile industry. For electric vehicles, battery technology is an important factor related to their development.

At present, with further popularity of lithium ion batteries, battery charging becomes increasingly important. How to quickly and safely charge the batteries has become the key to promoting electric vehicles. However, the inventors of this application have found that the existing battery charging and discharging systems have low efficiency and heavy load and can hardly control charging and discharging of the batteries effectively.

SUMMARY

In consideration of the foregoing problems, embodiments of this application provide a control system and a charging and discharging control system to resolve the foregoing problems in the prior art.

According to one aspect, an embodiment of this application provides a control system. The control system includes a control circuit and an intermediate computer, where the control circuit includes a pressure sensor, a piezoelectric valve, and a controller; the pressure sensor is configured to collect pressure information; the controller is configured to receive the pressure information collected by the pressure sensor and transmit the pressure information to an intermediate computer; the intermediate computer is configured to transmit the pressure information to an upper computer, receive a preset pressure value generated by the upper computer based on the pressure information, and transmit the preset pressure value to the controller; and the controller is further configured to control the piezoelectric valve based on the preset pressure value.

The control system provided in this embodiment of this application reduces the load of the upper computer, greatly improving efficiency of data exchange. In addition, the pressure sensor, the piezoelectric valve, and the controller are integrated in the control circuit, and an AI/AO output module at a PLC end is no longer required, reducing space usage of components and system costs. Furthermore, the system is protected by the intermediate computer, thereby increasing the sampling and response speed of the system, preventing impact resulted from the off-line upper computer, and greatly improving safety of the system.

In some embodiments, the intermediate computer is further configured to receive a pressure protection range transmitted by the upper computer, and when the pressure information is beyond the pressure protection range, transmit a control instruction to the control circuit to enable the control circuit to close the piezoelectric valve.

In this way, the intermediate computer can directly control the piezoelectric valve based on the pressure information and the pressure protection range. The safety protection of the control circuit is transferred from the upper computer to the intermediate computer, which can improve safety protection efficiency, avoid latency caused by indirect control through the intermediate computer, and greatly reduce the load of the upper computer.

In some embodiments, the control circuit further includes a conversion unit, where the conversion unit is configured to receive the pressure information and convert the pressure information into a digital signal.

The conversion unit is integrated with the control circuit, thereby enhancing integration of the control circuit and improving pressure acquisition efficiency.

In some embodiments, the control circuit further includes a pressure indicator; where the pressure indicator is electrically connected to the controller and configured to display the pressure information.

The pressure information can be more intuitively displayed by the pressure indicator, allowing more accurate and convenient pressure control on the piezoelectric valve.

In some embodiments, the control system further includes the upper computer, where the upper computer is electrically connected to the intermediate computer and configured to receive control circuit status information reported by the upper computer, and the upper computer transmits a control instruction to the intermediate computer based on the control circuit status information.

The intermediate computer periodically reports status information of the piezoelectric valve to the upper computer, so that the upper computer can know a status of the piezoelectric valve, reducing the load of obtaining the status of the piezoelectric valve.

In some embodiments, the control system includes a plurality of control circuits; and the plurality of control circuits are electrically connected to the intermediate computer. Integration of the control circuit is enhanced, which allows the control circuit to directly communicate with the intermediate computer, and the intermediate computer to directly control the piezoelectric valve, thereby enhancing system control over battery charging and discharging.

In some embodiments, the control system includes a plurality of intermediate computers; and the plurality of intermediate computers are electrically connected to the upper computer. In this way, the load of the upper computer is reduced, thereby greatly improving efficiency of data exchange.

According to another aspect, an embodiment of this application further provides a charging and discharging control system, including a power source and the control system provided in the foregoing embodiment, where the control system is used to perform charging and discharging control on the power source.

The control system and the charging and discharging control system provided in the embodiments of this application reduce the load of the upper computer, greatly improving efficiency of data exchange. In addition, the pressure sensor, the piezoelectric valve, and the controller are integrated in the control circuit, and an AI/AO output module at a PLC end is no longer required, reducing space usage of components and system costs. Furthermore, the system is protected by the intermediate computer, thereby increasing the sampling and response speed of the system, preventing impact resulted from the off-line upper computer, and greatly improving safety of the system.

The foregoing description is merely an overview of the technical solutions in the embodiments of this application. In order to better understand the technical means in the embodiments of this application, to achieve implementation according to content of the specification, and to make the foregoing and other objects, features and advantages in the embodiments of this application more obvious and easy to understand, the following describes specific embodiments of this application.

BRIEF DESCRIPTION OF DRAWINGS

All other advantages and benefits will become clear to a person of ordinary skill in the art by reading the detailed descriptions of the following preferred embodiments. The accompanying drawings are merely intended to illustrate the preferred embodiments, and should not be construed as a limitation on this application. Furthermore, the same reference signs represent the same components in all accompanying drawings. In the accompanying drawings.

DETAILED DESCRIPTION

Figure 1:
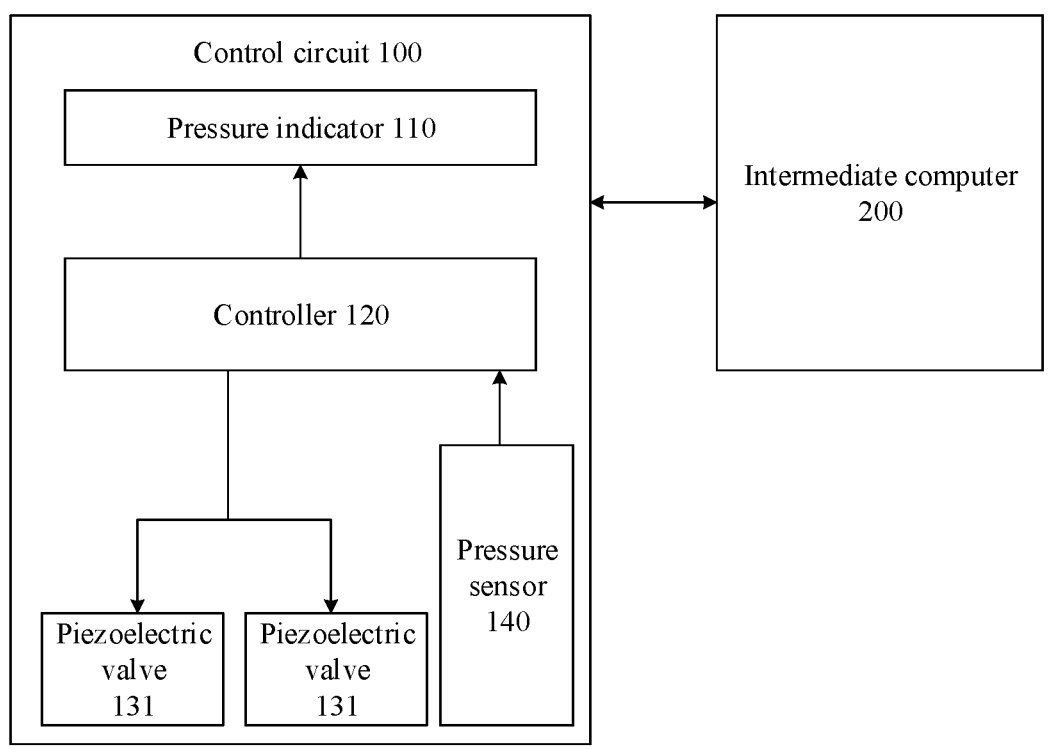
FIG. 1 is a schematic structural diagram of a control system according to an embodiment of this application.

The following describes in detail the embodiments of technical solutions in this application with reference to the accompanying drawings. The following embodiments are merely used to describe technical solutions in this application more explicitly, and therefore they are merely used as examples and do not constitute a limitation to the protection scope of this application.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", "comprise", and "having" and any other variations thereof in the specification, the claims and the foregoing brief description of drawings of this application are intended to cover a non-exclusive inclusion.

In descriptions of the embodiments of this application, the terms "first", "second", and the like are merely intended to distinguish between different objects, and shall not be understood as an indication or implication of relative importance or implicit indication of the number, specific sequence or dominant-subordinate relationship of indicated technical features. In the descriptions of the embodiments of this application, "a plurality of" means at least two unless otherwise specifically stated.

The term "embodiment" described herein means that specific features, structures or characteristics in combination with descriptions of the embodiments may be incorporated in at least one embodiment of this application. The word "embodiment" in various positions in the specification does not necessarily refer to a same embodiment, or an independent or alternative embodiment that is exclusive of other embodiments. Persons skilled in the art explicitly and implicitly understand that the embodiments described herein may combine with other embodiments.

In the descriptions of the embodiments of this application, the term "and/or" in this application describes only an association relationship for describing associated objects and represents that three relationships may exist. For example, A and/or B may represent the following three cases: A alone, both A and B, and B alone. In addition, the character "/" in this specification generally indicates an "or" relationship between contextually associated objects.

In the descriptions of the embodiments of this application, the term "a plurality of" means two (inclusive) or more. Similarly, "a plurality of groups" means two (inclusive) or more groups, and "a plurality of pieces" means two (inclusive) or more pieces.

In the descriptions of the embodiments of this application, the orientations or positional relationships indicated by the technical terms "center", "vertical", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings, are merely intended to facilitate the descriptions of the embodiments of this application and simplify the descriptions, are not intended to indicate or imply that the apparatuses or components mentioned in this application must have specific orientations, or be constructed and operated for a specific orientation, and therefore shall not be construed as a limitation to embodiments of this application.

In the descriptions of the embodiments of this application, unless otherwise specified and defined explicitly, the technical terms "installment", "link", "connection", and "fix" should be understood in their general senses. For example, the terms may be a fixed connection, a detachable connection, or an integrated connection; or may be a mechanical connection or an electrical connection; or may be a direct connection, or an indirect connection through an intermediate medium; or may be an internal connection between two components or an interactive relationship between two components. Persons of ordinary skills in the art can understand specific meanings of these terms in this application based on specific situations.

At present, from the development trend of market, batteries are becoming increasingly widespread. Batteries are used in energy storage power supply systems such as hydraulic power stations, thermal power stations, wind power stations, and solar power stations, in electric transport means such as electric bicycles, battery-operated motorcycles, and electric vehicles, and also in a plurality of fields such as military equipment and aerospace. With the expanding application fields of batteries, the market demands for batteries are also growing.

With the development of battery technologies, the demands for battery charging are also increasing in the market. At present, batteries often have safety hazards during charging and discharging. Especially during high-power charging and discharging, batteries easily become overheated. If temperature is excessively high, batteries may catch fire or even explode. Therefore, it is important to monitor the charging process in real time and control the charging process in real time based on battery status.

A battery charging and discharging control system typically includes an upper computer, an intermediate computer, a power supply system, and a control circuit connected to a to-be-charged battery. The upper computer is connected to the intermediate computer and configured to receive information transmitted by the intermediate computer, and transmit a control instruction to the intermediate computer based on the information transmitted by the intermediate computer. The intermediate computer is connected to the control system and the power supply system and configured to monitor and control battery charging and discharging. The power supply system is used to supply power to the battery. The control system is used to monitor battery charging and discharging and transmit monitoring information to the intermediate computer or the upper computer. The intermediate computer or the upper computer transmits a control instruction to the control system based on the monitoring information for controlling battery charging and discharging.

The upper computer is generally a computer that can directly transmit a control command and is mainly configured to perform overall monitoring and scheduling on a battery charging and discharging system. The upper computer shows overall running status of the system by displaying signal changes (hydraulic pressure, water level, temperature, and the like) on a screen.

The intermediate computer is a computer that directly controls a device and obtains device status. Such intermediate computer, generally a microprocessor or the like, has quick response speed, and can obtain device status in a timely manner, analyze the device status, and then transmit a control instruction to the device. Normally, a command transmitted by the upper computer is firstly transmitted to the intermediate computer, and the intermediate computer interprets the command into a corresponding timing signal and directly controls a corresponding device. The upper computer periodically obtains a device status through the intermediate computer, and the intermediate computer needs to obtain device status information in a timely manner, and transmit the device status information to the upper computer. In some cases, the intermediate computer can directly control a device without using the upper computer.

Conceptually, the upper computer and intermediate computer are relative concepts. Generally, an upper computer performs control and provides services, while a lower computer is controlled and served. An upper computer and an intermediate computer can also be understood as a master computer and a slave computer. However, the upper computer and the lower computer are interchangeable.

The power supply system is used to supply energy to a to-be-charged battery. The power supply system may be a mains system or an energy storage system, provided that it can supply power to the outside, which is not limited herein.

The control circuit is connected to the upper computer, the intermediate computer, and the power supply system, and configured to control the power supply system to supply power to the to-be-charged battery. During control of the power source for charging and discharging, the control circuit monitors a battery status, including changes in battery temperature, pressure, and withstand current, and feeds back the changes to the upper computer and the intermediate computer, and the upper computer and the intermediate computer control the charging and discharging process.

The piezoelectric valve is a new type of piezoelectric control apparatus that uses a proportional solenoid to replace original control parts on a common pressure valve, a flow valve, and a directional valve, and remotely controls gas pressure, flow, or direction continuously and proportionally based on input electrical signals. Generally, the piezoelectric valve has pressure compensation performance, ensuring that output pressure and flows are not affected by load changes. In the control system provided in the embodiments of this application, the control circuit controls battery charging and discharging by using the piezoelectric valve.

The inventors of this application have found that in the existing battery charging and discharging process, a dedicated PLC (programmable logic controller) is used to control the battery charging and discharging, and an upper computer needs to obtain battery pressure information through real-time obtaining of PLC packets, and control a piezoelectric valve based on the pressure information to implement pressure protection for charging and discharging, leading to a heavy load on the upper computer. In addition, communication between the upper computers is generally performed over TCP/IP, experiencing severe communication latency. Once a network cable connected to the upper computer is loose, the battery will lose pressure protection during charging and discharging. In addition, a dedicated AI/AO module needs to be configured for the PLC to obtain a pressure value of the battery. The configuration is complex, and the battery charging and discharging cannot be effectively controlled.

Therefore, an embodiment of this application provides a control system, in which a pressure sensor 140, a piezoelectric valve 131, and a controller 120 are integrated into a control circuit 100 that establishes a communication connection to an intermediate computer 200 to transmit pressure information originally transmitted to an upper computer to the intermediate computer 200, reducing the load of the upper computer. Furthermore, an AI/AO module of a PLC is no longer required, greatly reducing hardware costs. In this embodiment of this application, because the intermediate computer 200 directly controls the piezoelectric valve 131, safety hazards can be eliminated through timely safety control.

As shown in FIG. 1, the control system provided in this embodiment of this application includes a control circuit 100 and an intermediate computer 200, where the control circuit 100 includes a pressure sensor 140, a piezoelectric valve 131, and a controller 120; the pressure sensor 140 is configured to collect pressure information; the controller 120 is configured to receive the pressure information collected by the pressure sensor 140 and transmit the pressure information to the intermediate computer 200; the intermediate computer 200 is configured to transmit the pressure information to the upper computer, receive a preset pressure value generated by the upper computer based on the pressure information, and transmit the preset pressure value to the controller; and the controller 120 is further configured to control the piezoelectric valve 131 based on the preset pressure value.

During battery charging and discharging, the pressure sensor 140 collects battery pressure, obtains battery pressure information, and transmits the pressure information to the controller 120. After receiving the pressure information transmitted by the pressure sensor 140, the controller 120 converts the pressure information into a digital signal, and transmits the digital signal to the intermediate computer 200.

The intermediate computer 200 and the control circuit 100 are connected by using an RS485 bus or a CAN bus, the control circuit 100 directly writes the pressure information into an RS485 packet or a CAN packet for transmission to the intermediate computer 200, without bringing additional information overheads. Furthermore, the intermediate computer 200 receives, by using the RS485 bus or the CAN bus, the pressure information transmitted by the control circuit 100, which can ensure timely information obtaining and address information latency problems.

Upon system startup, the intermediate computer obtains a control instruction transmitted by the upper computer. The control instruction includes a preset pressure value, a pressure protection range, and the like. The intermediate computer transmits the preset pressure value to the control circuit, so that the control circuit controls the piezoelectric valve based on the preset pressure value. In addition, the intermediate computer also protects the control circuit based on the pressure protection range, so that when system pressure is beyond or below a preset threshold, the piezoelectric valve is shut down in a timely manner to protect the system.

During operation of the control system, after receiving pressure information, the intermediate computer 200 determines, based on the pressure information, whether to control the piezoelectric valve 131. When the pressure value is beyond the pressure protection range, the intermediate computer directly shuts down the piezoelectric valve through the controller. When the pressure information is within the pressure protection range, no processing is required, and the intermediate computer 200 transmits the pressure information to the upper computer for processing.

The piezoelectric valve 131 is configured to control and adjust pressure inside the battery under control of the controller 120. When the pressure information obtained by the pressure sensor exceeds the preset pressure value, the controller transmits control information to the piezoelectric valve 131, and adjusts the pressure inside the battery by controlling valve opening of the piezoelectric valve. The piezoelectric valve 131 may be provided in plurality, and the controller 120 is connected to the plurality of piezoelectric valves 131 to control pressure of different batteries or pressure at different positions of one battery.

Figure 2:
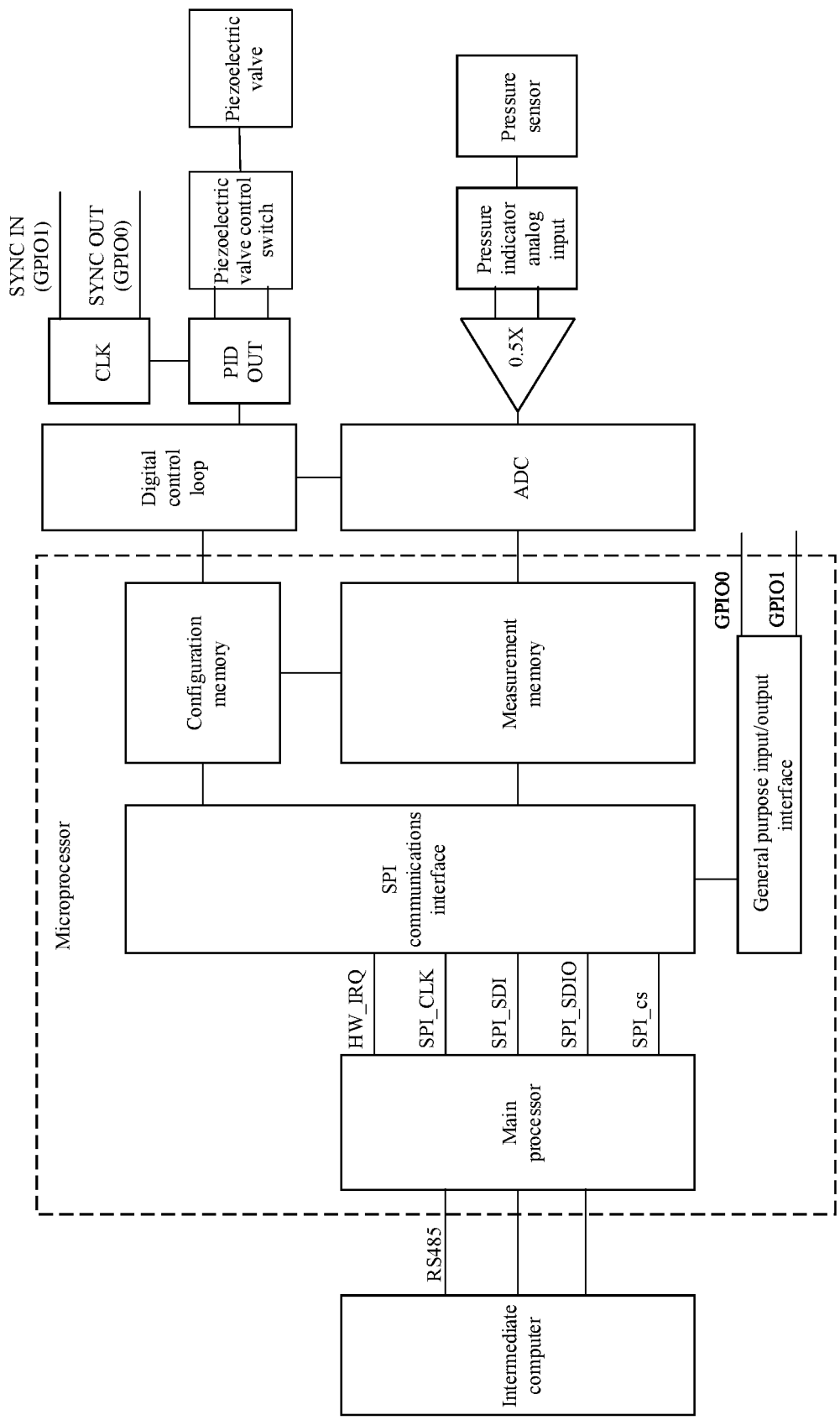
FIG. 2 is a circuit diagram of a control system according to an embodiment of this application.

FIG. 2 is a circuit diagram of a control system according to an embodiment of this application. The controller 120 may be an STM32F103 microprocessor or a microprocessor of other models. Such microprocessor includes a main processing unit, an SPI communication interface unit, a configuration memory, a measurement memory, and a general purpose input/output interface unit. The measurement memory is configured to obtain pressure information obtained by the pressure sensor 140, and transmit the pressure information to a main processor through the SPI communication interface, and the main processor transmits the pressure information to the intermediate computer 200 through an RS485 interface. The configuration memory is configured to control a control switch of the piezoelectric valve 131 through a digital control loop, thereby controlling the piezoelectric valve 131 to be opened or closed to adjust pressure of a battery.

In the embodiments of this application, during control of the piezoelectric valve 131, the intermediate computer 200 communicates with the control circuit 100, so that the control circuit can directly adjust the piezoelectric valve based on the pressure value through the controller, without using a PLC. The upper computer does not need to obtain pressure information of the piezoelectric valve 131 in real time, and the intermediate computer 200 only needs to periodically feedback status information of the piezoelectric valve 131 to the upper computer. This reduces the load of the upper computer, and specifically, reduces the software load of the upper computer by about 40%. In the prior art, one upper computer supports 3,000 power channels. In an optimized control system, one upper computer supports 4,500 power channels, thereby greatly improving efficiency of data exchange. In addition, the pressure sensor 140, the piezoelectric valve 131, and the controller 120 are integrated in the control circuit 100, and an AI/AO output module at a PLC end is no longer required, reducing space usage of components and system costs. Furthermore, pressure protection is provided for the system through the intermediate computer 200, thereby increasing the sampling and response speed of the system, preventing impact resulted from the off-line upper computer, and greatly improving safety of the system.

In some embodiments, the intermediate computer is further configured to receive a pressure protection range transmitted by the upper computer, and when the pressure information is beyond the pressure protection range, transmit a control instruction to the control circuit to enable the control circuit to close the piezoelectric valve.

Upon system startup, control information transmitted by the upper computer to the intermediate computer includes a pressure protection range. The pressure protection range is an allowable pressure range in the system, including allowable maximum pressure and allowable minimum pressure. When internal pressure is higher than the maximum pressure, the pressure is excessively large, easily causing safety hazards; when internal pressure is lower than the minimum pressure, lines are probably blocked. In either case, safety problems will be caused. At this time, the intermediate computer directly transmits a control instruction to the control system to close the piezoelectric valve, so as to prevent occurrence of such problems.

In this way, the intermediate computer can directly control the piezoelectric valve based on the pressure information and the pressure protection range. The safety protection of the control circuit is transferred from the upper computer to the intermediate computer, which can improve safety protection efficiency, avoid latency caused by indirect control through the intermediate computer, and greatly reduce the load of the upper computer.

In some embodiments, as shown in FIG. 2, the control circuit 100 includes a conversion unit. The conversion unit is configured to receive the pressure information, convert such pressure information into a digital signal, and transmit the digital signal to the controller 120. Typically, pressure information obtained by the pressure sensor 140 is an analog signal. The analog signal obtained by the pressure sensor 140 may be converted into a digital signal through the conversion unit for processing by the controller 120. The conversion unit may be an AD7656 conversion chip or a chip of other models, which is not limited herein. The conversion unit is integrated with the control circuit 100, thereby enhancing integration of the control circuit 100 and improving pressure acquisition efficiency.

In some embodiments, the control circuit 100 further includes a pressure indicator 110, where the pressure indicator 110 is electrically connected to the controller 120 and configured to display the pressure information. The pressure indicator 110 can display the pressure information more intuitively, allowing more accurate and convenient pressure control on the piezoelectric valve 131.

In some embodiments, the control system further includes an upper computer 300. The upper computer 300 is electrically connected to the intermediate computer 200 that reports control circuit status information to the upper computer 300, and the upper computer 300 transmits the control instruction to the intermediate computer 200 based on the control circuit status information.

The intermediate computer 200 periodically reports status information of the piezoelectric valve 131 to the upper computer 300, so that the upper computer 300 can know the status of the piezoelectric valve 131, reducing the load of obtaining the status of the piezoelectric valve 131. Control of the piezoelectric valve 131 is transferred to the intermediate computer 200, which greatly reduces the load of the upper computer 300 and empowers the upper computer 300 to control power channels.

Figure 3:
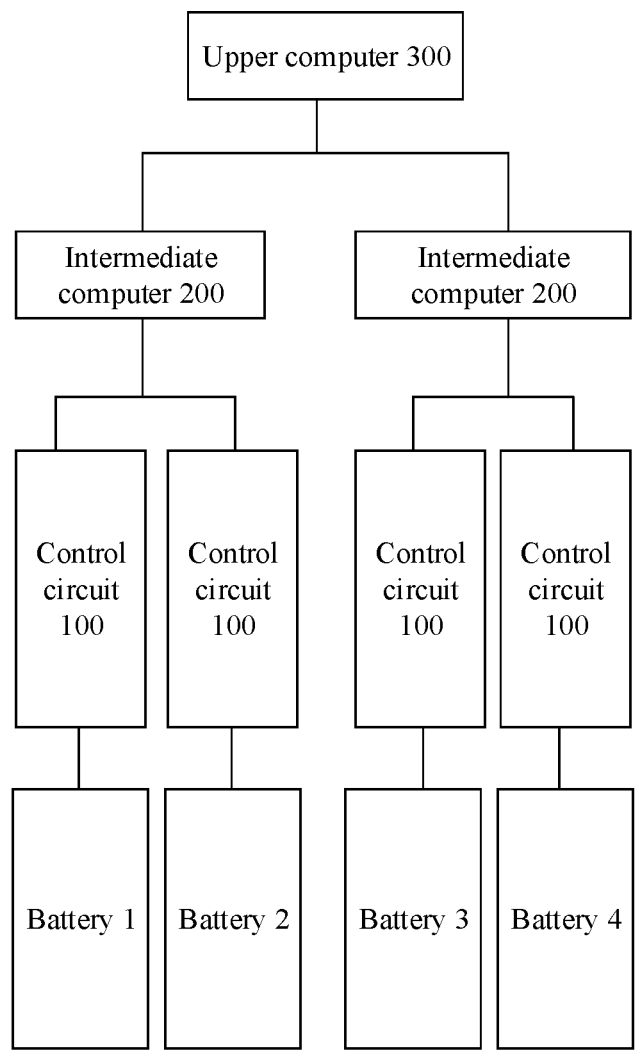
FIG. 3 is a schematic structural diagram of a charging and discharging control system according to an embodiment of this application.

In some embodiments, as shown in FIG. 3, the control system includes a plurality of control circuits 100; and the plurality of control circuits 100 are electrically connected to the intermediate computer 200, where each control circuit 100 can control charging and discharging of one or more batteries. The control circuit 100 and the intermediate computer 200 are connected by using an RS485 bus or a CAN bus, which can greatly improve communications efficiency and timeliness.

In the embodiment of this application, integration of the control circuit 100 is enhanced, which allows the control circuit 100 to directly communicate with the intermediate computer 200, and the intermediate computer 200 to directly control the piezoelectric valve 131, thereby enhancing system control over battery charging and discharging.

In some embodiments, as shown in FIG. 3, the control system includes a plurality of intermediate computers 200, and the plurality of intermediate computers 200 are electrically connected to the upper computer 300. This reduces the load of the upper computer, and specifically, reduces the software load of the upper computer 300 by about 40%. In the prior art, one upper computer 300 supports 3,000 power channels. In an optimized control system, one upper computer 300 supports 4,500 power channels, thereby greatly improving efficiency of data exchange.

This application further provides a charging and discharging control system, including a power source and the control system provided in the foregoing embodiments, where the control system is used to perform charging and discharging control on the power source. The control system has the same charging and discharging control logic for the power source as that in the foregoing embodiments.

The control system and the charging and discharging control system provided in the embodiments of this application reduce the load of the upper computer, greatly improving efficiency of data exchange. In addition, the pressure sensor, the piezoelectric valve, and the controller are integrated in the control circuit, and an AI/AO output module at a PLC end is no longer required, reducing space usage of components and system costs. Furthermore, the system is protected by the intermediate computer, thereby increasing the sampling and response speed of the system, preventing impact resulted from the off-line upper computer, and greatly improving safety of the system.

In conclusion, it should be noted that the foregoing embodiments are merely intended for describing the technical solutions of this application, but not for limiting this application. Although this application is described in detail with reference to the foregoing embodiments, persons of ordinary skills in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A control system for controlling charge or discharge of a battery comprising a control circuit and an intermediate computer; wherein
    the control circuit and the intermediate computer are connected via an RS485 interface or a controller area network (CAN) bus;
    the control circuit comprises a pressure sensor, a piezoelectric valve, and a controller;
    the pressure sensor is configured to obtain a pressure value inside the battery during the charge or discharge of the battery;
    the controller is configured to receive the pressure value collected by the pressure sensor, and transmit the pressure value to the intermediate computer;
    the intermediate computer is configured to transmit the pressure value to an upper computer which is in communication with the control system, receive a preset pressure value generated by the upper computer, and transmit the preset pressure value to the controller; and
    the controller is further configured to control the piezoelectric valve based on the preset pressure value.

2. The control system according to claim 1, wherein the intermediate computer is further configured to:
    receive a pressure protection range from the upper computer, and
    when the pressure value is beyond the pressure protection range, transmit a control instruction to the control circuit, to enable the control circuit to close the piezoelectric valve.

3. The control system according to claim 1, wherein the control circuit further comprises a conversion unit; wherein
    the conversion unit is configured to receive the pressure value and convert the pressure value into a digital signal.

4. The control system according to claim 1, wherein the control circuit further comprises a pressure indicator; wherein
    the pressure indicator is electrically connected to the controller and configured to display the pressure value.

5. The control system according to claim 1, wherein the control system further comprises the upper computer, wherein
    the upper computer is electrically connected to the intermediate computer and configured to receive control circuit status information from the intermediate computer; and
    the upper computer is further configured to transmit a control instruction to the intermediate computer based on the control circuit status information.

6. The control system according to claim 5, wherein
    the control system comprises a plurality of control circuits; and
    the plurality of control circuits are electrically connected to the intermediate computer.

7. The control system according to claim 6, wherein
    the control system comprises a plurality of intermediate computers; and
    the plurality of intermediate computers are electrically connected to the upper computer.

8. A charge and discharge control system, comprising:
    a power source; and
    the control system according to claim 1,
wherein the control system is configured to control charge or discharge of the power source.

9. The control system according to claim 1, wherein the pressure sensor, the piezoelectric valve, and the controller are integrated in the control circuit, and the controller is connected to the pressure sensor and to the piezoelectric valve, respectively.

10. The control system according to claim 1, wherein the piezoelectric valve is configured to control and adjust the pressure inside the battery under the control of the controller; and
 wherein when the pressure value obtained by the pressure sensor exceeds the preset pressure value, the controller transmits control information to the piezoelectric valve, and the piezoelectric valve adjusts the pressure inside the battery by controlling valve opening of the piezoelectric valve.

11. A method for controlling charge or discharge of a battery, performed by a control system that comprises a control circuit and an intermediate computer, wherein the control circuit and the intermediate computer are connected via an RS485 interface or a controller area network (CAN) bus, and the control circuit comprises a pressure sensor, a piezoelectric valve, and a controller, wherein the method comprises:
 obtaining, by the pressure sensor, a pressure value inside the battery during the charge or discharge of the battery;
 transmitting, by the controller, the pressure value collected by the pressure sensor to the intermediate computer;
 transmitting, by the intermediate computer, the pressure value to an upper computer which is in communication with the control system, and receiving a preset pressure value generated by the upper computer; and
 controlling, by the controller, the piezoelectric valve to adjust the pressure inside the battery according to the preset pressure value.

* * * * *